(12) United States Patent
Stang et al.

(10) Patent No.: US 8,583,069 B2
(45) Date of Patent: Nov. 12, 2013

(54) METHOD AND ARRANGEMENT FOR REDUCING INTERFERENCE IN A RECEIVED SIGNAL

(75) Inventors: Udo Stang, Regensburg (DE); Thomas Wagner, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/146,690

(22) PCT Filed: Nov. 2, 2010

(86) PCT No.: PCT/EP2010/066618
§ 371 (c)(1),
(2), (4) Date: Jul. 28, 2011

(87) PCT Pub. No.: WO2011/054810
PCT Pub. Date: May 12, 2011

(65) Prior Publication Data
US 2012/0207194 A1  Aug. 16, 2012

(30) Foreign Application Priority Data
Nov. 4, 2009  (DE) .......................... 10 2009 051 817

(51) Int. Cl.
*H04B 1/10* (2006.01)
(52) U.S. Cl.
USPC ....... 455/296; 455/501; 455/63.1; 455/67.11; 455/68; 375/346

(58) Field of Classification Search
USPC ........ 455/501, 67.11, 63.1, 68, 73, 39, 114.2, 455/296; 375/346
See application file for complete search history.

(56) References Cited

U.S. PATENT DOCUMENTS

| 6,107,960 | A | 8/2000 | Krasner |
| 6,922,551 | B1 | 7/2005 | Bristow et al. |
| 2002/0193108 | A1* | 12/2002 | Robinett ....................... 455/427 |
| 2003/0236065 | A1 | 12/2003 | Leinonen et al. |
| 2007/0004336 | A1* | 1/2007 | Aloni-Lavi et al. .......... 455/63.1 |
| 2007/0173282 | A1 | 7/2007 | Noda et al. |
| 2008/0119140 | A1* | 5/2008 | Maligeorgos et al. ..... 455/67.13 |
| 2011/0002405 | A1* | 1/2011 | Raveendran .................. 375/260 |

FOREIGN PATENT DOCUMENTS

| EP | 1 675 287 A1 | 6/2006 |
| WO | 99/36795 A1 | 7/1999 |

\* cited by examiner

*Primary Examiner* — Tuan Pham
(74) *Attorney, Agent, or Firm* — Laurence A. Greenberg; Werner H. Stemer; Ralph E. Locher

(57) ABSTRACT

A method and arrangement reduce an interference which is caused in a received signal from a reception antenna by a transmitted signal with transmitted data which are distributed stochastically over time from a transmission antenna which is physically close by. The transmission of the transmitted signal from the transmission antenna is activated and deactivated by a control signal from a control circuit over time such that reception dropouts in the received signal which are caused by the interference are corrected by an error correction unit for the received signal.

13 Claims, 4 Drawing Sheets

METHOD AND ARRANGEMENT FOR REDUCING INTERFERENCE IN A RECEIVED SIGNAL

BACKGROUND OF THE INVENTION

Field of the Invention

The invention relates to a method and an arrangement for reducing interference caused in a received signal from a reception antenna by a transmission signal from a transmission antenna that is physically very close by.

Particularly for applications in vehicles, there is frequently the problem that transmission and reception antennas for different radio based services are arranged physically close to one another. In this case, the transmission signal from a transmission antenna can cause significant interference in the received signal from a reception antenna. One example of this is a reception antenna for digital satellite radio frequencies (XM, SIRIUS, SDARS=Satellite Digital Audio Radio Services) which is arranged in or on a vehicle and a transmission antenna for services based on WLAN or WIMAX, for example, which is arranged physically close by said reception antenna. In this case, digital satellite radio frequencies in the frequency range from 2.3240 GHz to 2.3450 GHz are received, with WLAN b, g channels transmitting in the frequency range from 2.4000 GHz to 2.4835 GHz, for example. When the transmission antenna transmits data to a WLAN arrangement, the reception frequencies of an exemplary SDARS receiver can become subject to interference as a result of sidebands of the WLAN channels (for example as a result of a usually very sensitive input amplifier for the SDARS arrangement being overdriven).

Mutually independent, simultaneous operation of an SDARS satellite receiver and a WLAN based data transmission arrangement, for example, therefore results in undesirable interference in the SDARS reception. Similar problems can also arise when a plurality of reciprocally influencing WLAN antennas or WLAN and WIMAX antennas are arranged physically close. Reduction of such interference by means of radio frequency filtering in an SDARS preamplifier, for example, is possible only to a restricted extent when applied in vehicles for reasons of cost and on account of the small amount of installation space available. Such filtering would furthermore undesirably alter the prescribed characteristic of the input amplifier in the signal reception path.

BRIEF SUMMARY OF THE INVENTION

It is an object of the present invention to specify a method for reducing interference caused in the received signal from a reception antenna by a transmission signal from a transmission antenna that is physically very close by in which the cited disadvantages are avoided.

The object is achieved in particular by a method for reducing interference caused in a received signal from a reception antenna by a transmission signal containing transmission data, stochastically distributed over time, from a transmission antenna that is physically very close by, in which the emission of the transmission signal from the transmission antenna is recurrently deactivated for a respective period of time such that the interference in the received signal that is caused by the appearance of the transmission signal is completely corrected by error correction for the received signal.

The arrangement according to the invention comprises a reception antenna for receiving received signals, a transmission antenna, which is physically very close by the reception antenna, for emitting a transmission signal containing transmission data which are stochastically distributed over time, a transmission unit which is connected to the transmission antenna for the purpose of activating the latter, a reception unit which is connected to the reception antenna, an error correction unit, and a control circuit, wherein the control circuit recurrently deactivates the emission of the transmission signal for a respective period of time such that the interference in the received signal that is caused upon the appearance of the transmission signal is completely corrected by the error correction unit for the received signal.

The invention is explained in more detail below with reference to the exemplary embodiments illustrated in the figures of the drawings, where identical elements are provided with the same reference symbols. In the drawings:

DESCRIPTION OF THE INVENTION

Figure 1:
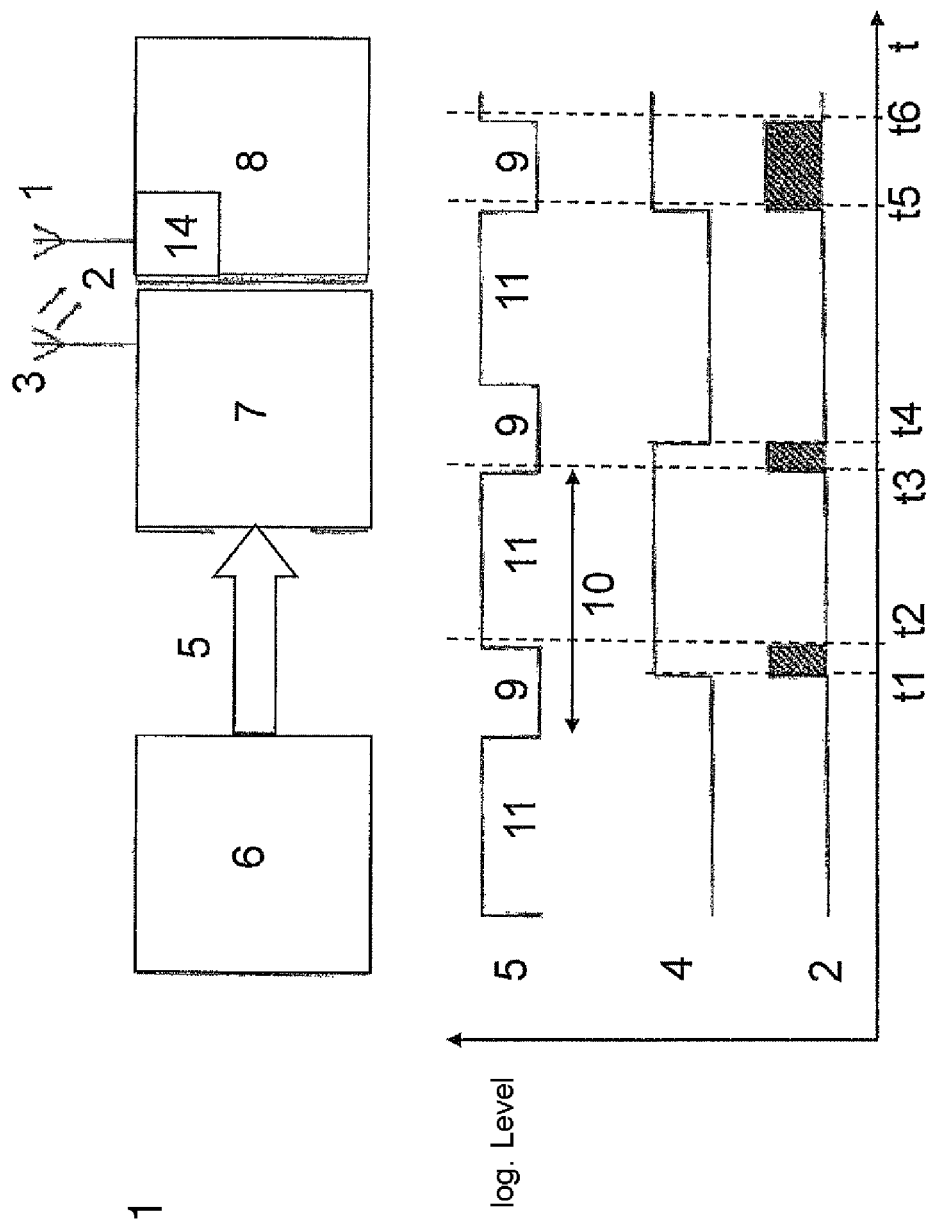
FIG. 1 shows a block diagram and a timing diagram for a first exemplary sequence of the method according to the invention.

FIG. 1 shows a block diagram and a timing diagram for an exemplary sequence of the method according to the invention.

An arrangement as shown in FIG. 1 comprises a reception antenna 1 and a transmission antenna 3 arranged physically close thereto, a reception unit 8 connected to the reception antenna 1, and an error correction unit 14 which, by way of example, is integrated in the reception unit 8. In addition, FIG. 1 contains a transmission unit 7 which is connected to the transmission antenna 3 and which may also be in the form of a transmission and reception unit if the antenna 3 is also used for receiving signals, and also a control circuit 6.

In this case, the error correction unit 14 prompts dropouts in the received signal which are caused by interference, for example, to be corrected to a particular degree. This means that the reception dropouts lasting a particular maximum proportionate period of time in a prescribed period of time can be corrected, such as reception dropouts which occur proportionately for the period of no more than 25% of the prescribed period of time.

In accordance with the invention, the error correction 14 which is usually already present in a reception unit such as the reception unit 8 is used, wherein the time profile of the emission of the transmission signal is activated and deactivated such that the maximum correction capability of the error correction 14 is not exceeded. In a first exemplary embodiment, shown in FIG. 1, this is done by virtue of the control circuit 6 producing a control signal 5 which activates the transmission signal 2 from the transmission antenna 3 periodically for a respective particular maximum proportionate period of time 9 (for example 25%) in a prescribed period of time 10. In this case, the particular maximum proportionate period of time 9 corresponds to that period of time for which the error correction 14 can only just correct reception dropouts in the received signal from the reception antenna 1. For the remaining period of time 11, the emission of the transmission signal 2 is deactivated in this case. The control signal 5 therefore controls the coexistence of transmission and reception periods and may be a pulse width modulated signal in an appropriate form, for example.

In this case, data which are actually transmitted in a transmission signal 2 are able not only to be present continuously but also to occur in a manner stochastically distributed over time, for example, as is usually the case with the WLAN data transmissions. One example of this is the transmitted data signal from a WLAN data transmission, as shown by way of example by the profile of the curve 4 in FIG. 1. In this case, a high level in the curve 4 means that WLAN data are present in the transmission signal 2, and a low level indicates that there are no WLAN data present in the transmission signal 2 at this instant. The described profile of the curves 4 and 5 produces the profile of actually transmitted WLAN data which is shown on the basis of curve 2. This corresponds to pulse width modulation of the transmitted WLAN data.

In this context, it can be seen that, from the first succession of data in the WLAN data (see high level, curve 4), only a respective low proportion is transmitted at the start (t1 to t2) and at the end (t3 to t4) of the succession of data, since the emission of the transmission signal 2 has been deactivated over a large range of the succession of data (see signal component 11 of the curve 5 at a high level, t2 to t3). By contrast, from the second WLAN succession of data (see curve 4), a proportion is transmitted (see curve 2, t5 to t6) which corresponds to the maximum proportionate period of time 9 in the prescribed period of time 10 (see curve 2 and occurrence of the maximum proportionate period of time 9 over time in curve 5).

On account of the stochastic distribution of the WLAN data over time in the transmission signal 2, a severely fluctuating component of the WLAN data actually transmitted on the basis of the method shown in FIG. 1 is thus obtained when complete error correction of the received signal from the reception antenna 1 is assured. In the case considered, it is assumed that the received signal from the reception antenna 1 is a continuous received signal, such as the signal from a digital satellite radio (SDARS). Owing to the severely fluctuating component of the actually transmitted WLAN data, single data packets need to be transmitted (emitted) again on the basis of the WLAN specification, and the data transmission rate is reduced. Further exemplary embodiments of the method, which are shown in the subsequent figures, aim to minimize this reduction in the data transmission rate.

The exemplary embodiment shown in FIG. 2 again comprises a reception antenna 1 and a transmission antenna 3 arranged physically close thereto, a reception unit 8 connected to the reception antenna 1, and an error correction unit 14 which, by way of example, is integrated in the reception unit 8. In addition, FIG. 2 shows a transmission unit 7 which is connected to the transmission antenna 3 and which may also be in the form of a transmission and reception unit if the antenna 3 is also used for receiving signals, and also a control circuit 6.

Figure 2:
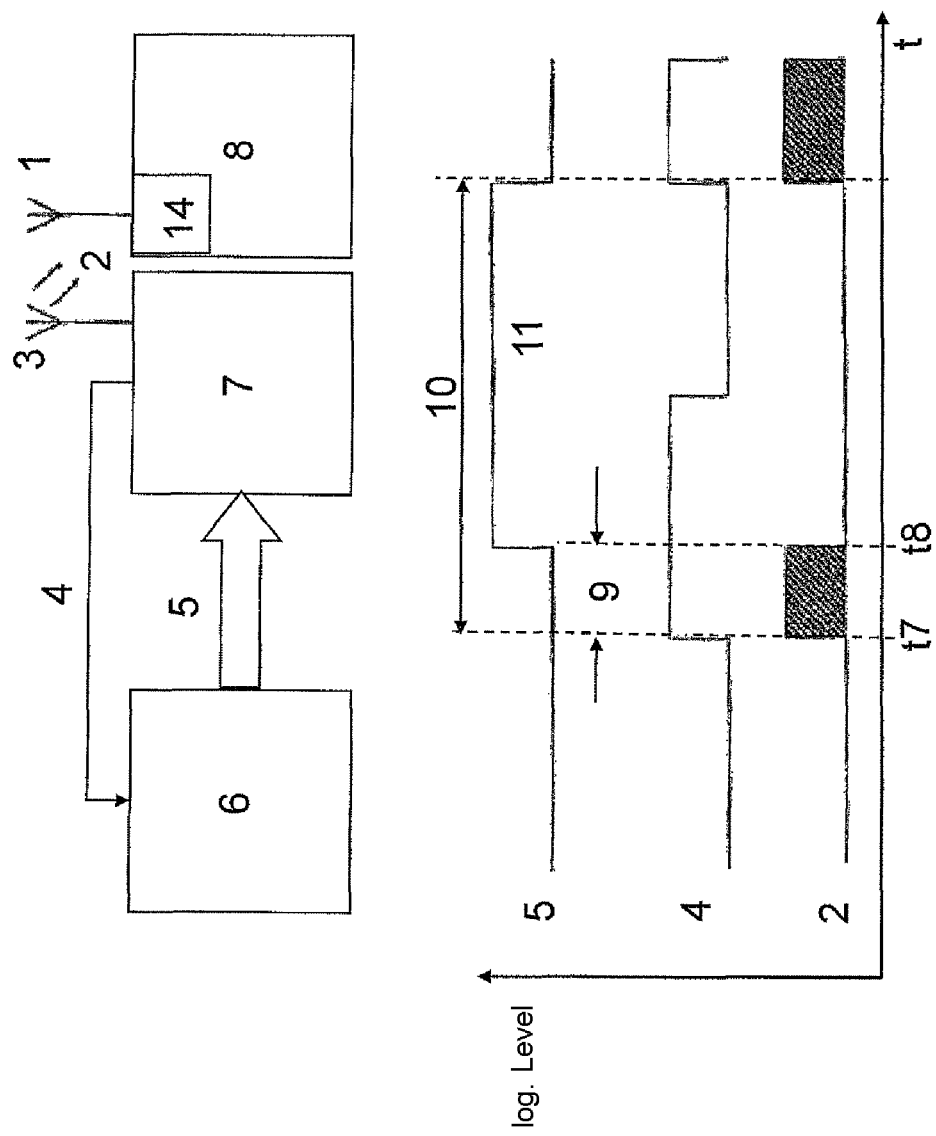
FIG. 2 shows a block diagram and a timing diagram for a second exemplary sequence of the method according to the invention.

In addition to the embodiment shown in FIG. 1, a control loop is formed by providing the control circuit 6 with the information regarding when the transmission signal 2 actually contains transmission data 4 (see high level of curve 4 in FIGS. 1 and 2). In this case, the control circuit 6 puts the transmission signal 2 into an active state (see low level, curve 5), for example, which is initially retained until the transmission signal 2 contains transmission data 4 (instant t7). From this instant onward, the transmission signal 2 then continues to be left in the active state for the maximum proportionate period of time (t7 to t8), and subsequently the emission of the transmission signal 2 is deactivated for the remaining period of time 11 (see high level, curve 5) in the prescribed period of time 10 in order to meet the conditions for the error correction 14. In contrast to the embodiment shown in FIG. 1, the method shown in FIG. 2 involves the actual occurrence of stochastically distributed transmission data 4 in the transmission signal 2 being taken into account in order to achieve improved data transmission for the transmission signal 2.

As an alternative, the control circuit 6 can also activate the transmission signal 2 for the maximum proportionate period of time 9 in each case only as soon as transmission data 4 are present in the transmission signal 2 and subsequently deactivate the emission of the transmission signal 2 for the remaining period of time 11 in the prescribed period of time 10.

Figure 3:
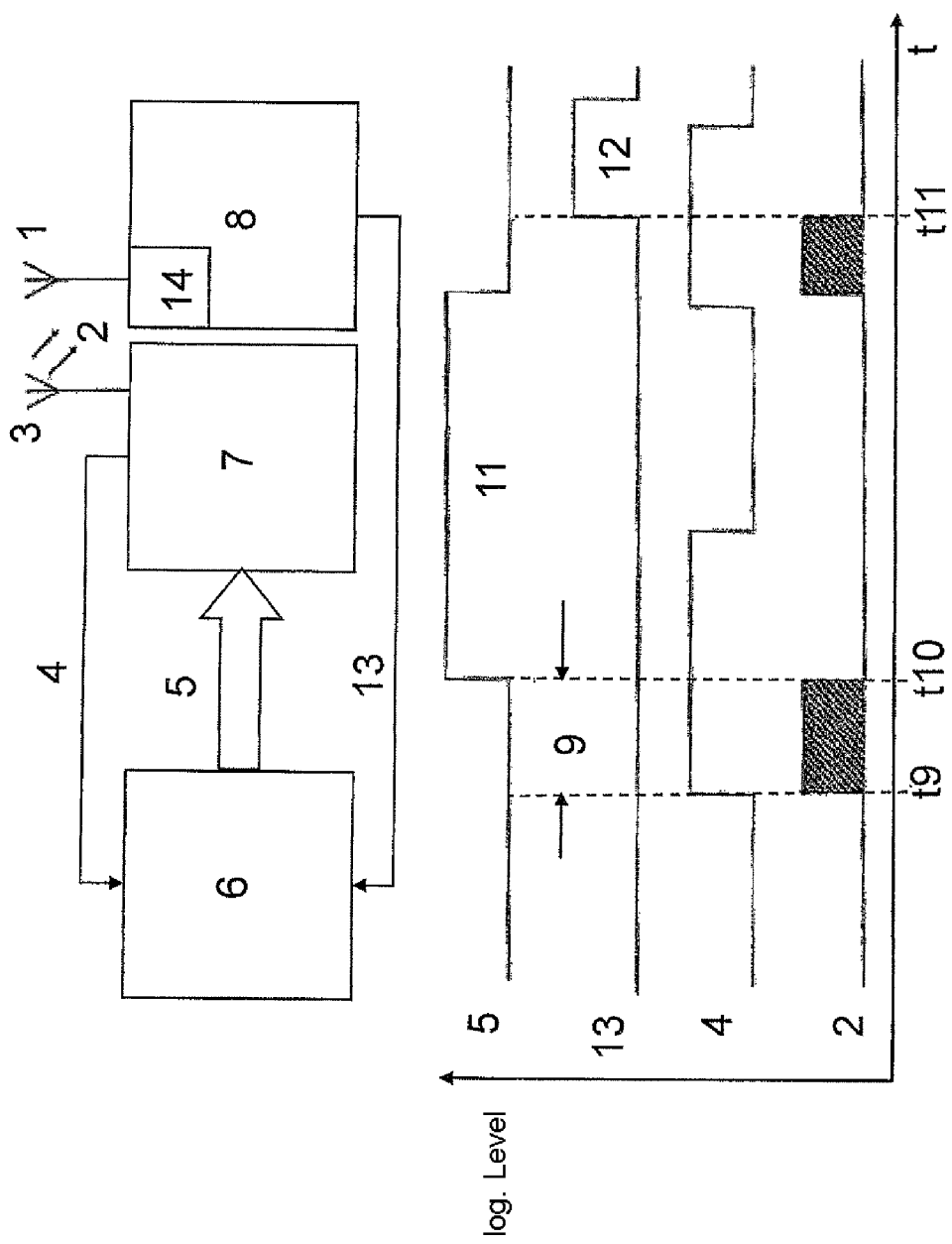
FIG. 3 shows a block diagram and a timing diagram for a third exemplary sequence of the method according to the invention.

FIG. 3 shows a block diagram and a timing diagram for a further exemplary embodiment of the method according to the invention, again with a reception antenna 1 and a transmission antenna 3 arranged physically close thereto, a reception unit 8 connected to the reception antenna 1, and an error correction unit 14 which, by way of example, is integrated in the reception unit 8. In addition, a transmission unit 7 which is connected to the transmission antenna 3, and which may also be in the form of a transmission and reception unit if the antenna 3 is also intended to be used for receiving signals, and a control circuit 6 are provided.

In addition to the information regarding when the transmission signal 2 actually contains transmission data 4 (high level, curve 4), a signal 13 in this embodiment is used to provide the control circuit 6 with the information regarding when the reception unit 8 connected to the reception antenna 1 detects an excessively low reception quality and/or error correction reserve. This is the case at instant t11 in the example shown, when the curve 13 shown in FIG. 13 is at a high level, denoted by 12. In this case, the control circuit 6 deactivates the emission of the transmission signal 2 again following activation as early as (instant t11) when the reception unit 8 connected to the reception antenna 1 detects an excessively low reception quality and/or error correction reserve (see 12 in curve 13). This takes account not only of the theoretically possible correction of the error correction unit 14 but also of the actual reception quality of the signal from the reception antenna 1. In this case, the error correction unit 14 stores data for the error correction. In the case of interference as a result of other transmission signals or in the case of obstacles to reception, such as underpasses, trees, etc., these data are "expended" and "filled" again when the interference has ended. If the received signal is very weak for a particular period of time, this filling is not possible during this period of time. Both pieces of information (reception quality and memory status) are used to form the curve 13 shown in FIG. 3.

Figure 4:
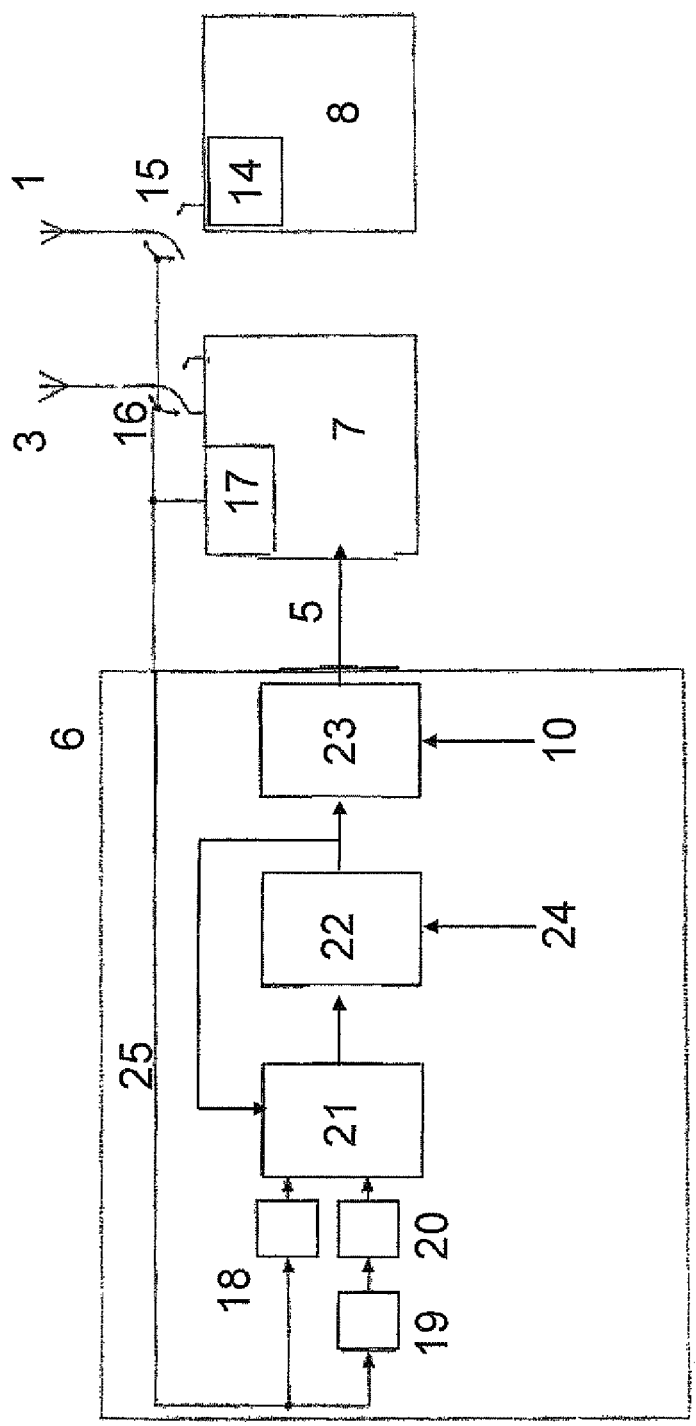
FIG. 4 shows a block diagram for an arrangement for carrying out the method according to the invention as shown in FIG. 3.

FIG. 4 shows a block diagram of an example of implementation of the method in or on a vehicle, for example. The arrangement shown in FIG. 4 comprises a reception antenna 1 and a transmission/reception antenna 3 arranged physically close thereto, an SDARS reception unit 8 which is connected to the reception antenna 1 and which has an error correction unit 14 which, by way of example, is integrated in the reception unit 8. In addition, a WLAN transmission/reception unit 7 which is connected to the transmission antenna 3 and which has a transmission and reception controller 17, a signal generation unit 18, a signal inverter 19, a signal generation unit 20, an adding unit 21, a register 22, a digital comparator 23 and also two radio frequency changeover switches 15 and 16 are provided.

The radio frequency changeover switch 16 is used to connect the transmission/reception antenna 3 for transmission purposes to the transmission signal 2 from the WLAN transmission/reception unit 7 or for the purpose of receiving signals to a reception arrangement integrated in the WLAN transmission/reception unit 7, wherein the drawing shows the switching state in which the transmission/reception antenna 3 is connected for transmission purposes. The simple embodiment—shown in this case to improve clarity—of activation and deactivation of the transmission signal and/or received signal by means of switches at the output and input of the WLAN transmission/reception unit 7 can be replaced by any desired type of activation and deactivation, however, such as transfer to a quiescent or idle mode or even disconnection of appropriate circuit portions, in that case particularly also additionally for the purpose of saving power. The radio frequency changeover switch 15 is used to isolate the reception antenna 1 from the SDARS reception unit 8 for the respective period of time for which the transmission/reception antenna 3 is connected for transmission purposes (see FIG. 4), so that interference signals from the transmission/reception antenna 3 cannot result in undesirable lowering of the sensitivity of an input amplifier in the SDARS reception unit 8. For the purpose of appropriate control, the radio frequency changeover switches 15 and 16 are connected to the transmission and reception controller 17 of the WLAN transmission/reception unit 7. In this case, the transmission and reception controller 17 produces an appropriate status signal 25 which indicates the transmission mode.

This status signal 25 is also used for activating the control circuit 6. The control circuit 6 has the signal generation unit 18, the signal inverter 19, the signal generation unit 20, the adding unit 21, the register 22 and the digital comparator 23. The control circuit is actuated periodically by means of a sampling clock signal 24 in order to process the status signal 25 or the data formed therefrom. To this end, the signal generation unit 18 and the signal generation unit 20 with the upstream signal inverter 19 are connected to the status signal 25 from the transmission and reception controller 17.

If the status signal 25 indicates an active transmission mode for the transmission/reception antenna 3 of the WLAN transmission/reception unit 7, the signal generation unit 18 produces a value +n defining the duty ratio of the WLAN signal and outputs it to the adding unit 21. If the status signal 25 indicates a nonactive transmission mode, that is to say a reception mode, for the transmission/reception antenna 3 of the WLAN transmission/reception unit 7, the signal generation unit 20 is actuated by the signal inverter 19 and outputs a value −1 to the adding unit 21. As a third input signal, the adding unit 21 receives the value currently stored in the register 22. This process is repeated for each sample clock signal 24. In this case, the adding unit 21 is set up such that an overflow less than zero and an overflow greater than a prescribed maximum value are prevented. The following is true in this case: if a sum less than zero is obtained, the sum is set to zero, and if a sum greater than the prescribed maximum value is obtained, the sum is set to the prescribed maximum value of the counter. The respective result from the adding unit 21 in the respective sampling cycle is buffer-stored in the register 22. The duty ratio between active and inactive WLAN transmission mode is in this case obtained as:

$$\text{WLANinactive}/\text{WLANactive} = 1/(n+1)$$

For the sampling rate produced by the sampling clock signal 24, it is then true that it needs to be greater than (2/minimum period of the transmission data). The digital comparator 23 compares the current value in the register 22 with the prescribed value 10 for the period of time which needs to be considered, on which the percentage period of time for the transmission mode of the WLAN transmission/reception unit 7 is based, and, as the result, controls the WLAN transmission clearance by means of the control signal 5.

LIST OF REFERENCE SYMBOLS

1 Reception antenna
2 Transmission signal
3 Transmission antenna
4 Time profile for transmission data
5 Control signal
6 Control circuit
7 Transmission/reception unit
8 Reception unit
9 Maximum proportionate period of time
10 Prescribed period of time
11 Remaining period of time
12 Excessively low reception quality
13 Status signal for reception quality
14 Error correction unit
15 Radio frequency changeover switch
16 Radio frequency changeover switch
17 Transmission/reception controller
18 Signal generation unit
19 Signal inverter
20 Signal generation unit
21 Adding unit
22 Register
23 Digital comparator
24 Sampling clock signal
25 Status signal
t Time
tn Instant n

The invention claimed is:

1. A method for reducing an interference caused in a received signal from a reception antenna by a transmission signal containing transmission data, stochastically distributed over time, from a transmission antenna that is physically very close by, which comprises the step of:

with a control circuit, providing a control signal to a transmission unit causing the transmission unit to activate the transmission antenna while concurrently receiving the received signal with a reception unit, and generating the control signal with a control circuit to recurrently deactivate an emission of the transmission signal from the transmission antenna for a respective period of time such that the interference in the received signal that is caused upon an appearance of the transmission signal is completely corrected by error correction for the received signal;

wherein the control signal that is generated by the control circuit recurrently activates and deactivates the emission of the transmission signal from the transmission antenna dependent on an error correction capability of an error correction unit performing the error correction.

2. The method according to claim 1, which further comprises:
activating the emission of the transmission signal for a maximum proportionate period of time whenever the transmission data are present in the transmission signal; and
subsequently deactivating the emission of the transmission signal for a remaining period of time in a prescribed period of time.

3. The method according to claim 1, wherein the transmission signal has its transmission power minimized to an extent that error-free data transmission to an associated receiver is assured.

4. The method according to claim 1, which further comprises transmitting the received signals on digital satellite radio frequencies, and the transmission signal transmits data services and broadcast services.

5. A method for reducing an interference caused in a received signal from a reception antenna by a transmission signal containing transmission data, stochastically distributed over time, from a transmission antenna that is physically very close by, which comprises the steps of:
with a control circuit, providing a control signal to a transmission unit causing the transmission unit to activate the transmission antenna while concurrently receiving the received signal with a reception unit, and generating the control signal with a control circuit to recurrently deactivate an emission of the transmission signal from the transmission antenna for a respective period of time such that the interference in the received signal that is caused upon an appearance of the transmission signal is completely corrected by error correction for the received signal, and
wherein the error correction for the received signal corrects the interference in the received signal lasting a respective maximum proportionate period of time in a prescribed period of time.

6. The method according to claim 5, which further comprises:
periodically activating the emission of the transmission signal for the respective maximum proportionate period of time; and
subsequently deactivating the emission of the transmission signal for a remaining period of time in the prescribed period of time.

7. The method according to claim 6, which further comprises deactivating the emission of the transmission signal again following activation as early as when a reception unit connected to the reception antenna detects an excessively low reception quality.

8. The method according to claim 5, which further comprises:
activating the emission of the transmission signal until the transmission signal contains the transmission data, the emission of the transmission signal then continues to be activated for the respective maximum proportionate period of time; and
subsequently deactivating the emission of the transmission signal for a remaining period of time in the prescribed period of time.

9. A configuration for reducing interference in a received signal, the configuration comprising:
a reception antenna for receiving the received signal;
a transmission antenna, disposed physically close by said reception antenna, for emitting a transmission signal containing transmission data which are stochastically distributed over time;
a transmission unit connected to said transmission antenna for activating said transmission antenna;
an error correction unit;
a reception unit connected to said reception antenna, and also to said error correction unit; and
a control circuit configured such that said control circuit provides a control signal to said transmission unit causing said transmission unit to activate said transmission antenna while concurrently receiving the received signal with said reception unit, and the control signal is generated to recurrently deactivate an emission of the transmission signal for a respective period of time, so that the interference in the received signal that is caused upon an appearance of the transmission signal is completely corrected by said error correction unit for the received signal; and
wherein the control signal that is generated by said control circuit recurrently activates and deactivates the emission of the transmission signal from said transmission antenna dependent on an error correction capability of said error correction unit.

10. The configuration according to claim 9, wherein said error correction unit corrects the interference in the received signal, and said control circuit subsequently deactivates the emission of the transmission signal for a remaining period of time in a prescribed period of time.

11. The configuration according to claim 10, wherein said control circuit is configured such that said control circuit uses a connection to said transmission unit to receive a piece of information about a time profile of the stochastically distributed transmission data from said transmission unit, and in that said control circuit activates the emission of the transmission signal for a maximum proportionate period of time whenever the transmission data are present in the transmission signal, and subsequently deactivates the emission of the transmission signal for the remaining period of time in the prescribed period of time.

12. The configuration according to claim 10, wherein said control circuit is configured such that said control circuit uses an appropriate connection to said reception unit to receive a status signal about a reception quality of the received signal from said reception unit, and in that said control unit deactivates the emission of the transmission signal again following activation as early as when said reception unit connected to said reception antenna detects an excessively low reception quality for the received signal.

13. The configuration according to claim 10, further comprising a radio frequency switch, said reception antenna is connected to said reception unit via said radio frequency switch such that said reception antenna is isolated from said reception unit by said radio frequency switch when the transmission signal has been activated and the transmission data are present in the transmission signal.

* * * * *